J. BOWER.
Cultivator.
No. 101,976.
Patented April 19, 1870.
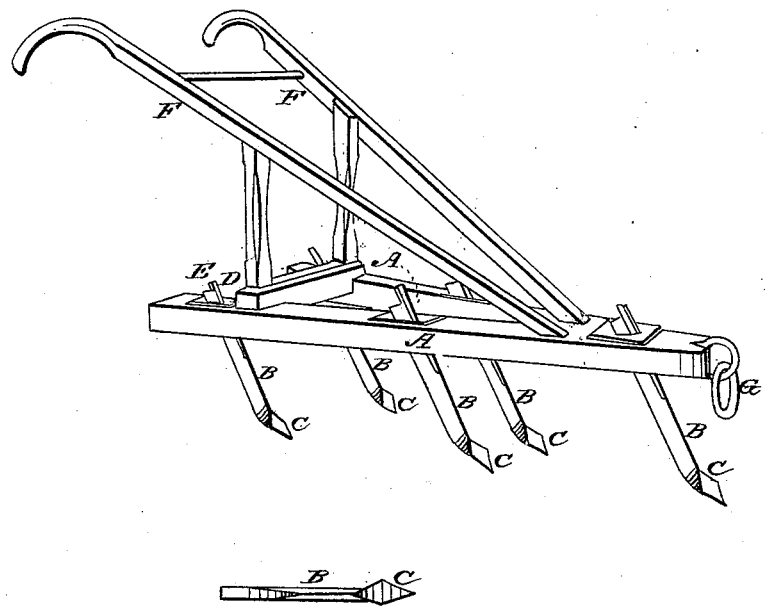

UNITED STATES PATENT OFFICE.

JACOB BOWER, OF DAYTON, OHIO.

IMPROVEMENT IN CULTIVATORS.

Specification forming part of Letters Patent No. 101,976, dated April 19, 1870.

*To all whom it may concern:*

Be it known that I, JACOB BOWER, of Dayton, in the county of Montgomery and State of Ohio, have invented a new and useful Improvement in Cultivators; and I do hereby declare that the following is a full and exact description thereof, reference being had to the accompanying drawing, and to the letters of reference marked thereon.

The figure or drawing accompanying this specification represents a perspective view of my improved cultivator.

The object of my invention is to furnish a cultivator for cultivating strawberries and other tender plants, which, while it effectually stirs up and mellows the earth at some depth below the surface, shall not greatly disturb the surface of the ground, nor cause too much earth to be thrown thereon and cover or injure the plants, while it will agitate the upper soil and pull out and cut the weeds; and my invention consists in the combination of a shovel with a thin cutter or edged shank projecting some distance below the cultivator-frame, in the manner herein fully set forth.

In the accompanying drawing, A A denote the main frame of the cultivator; B B, the shanks of the teeth; C C, the shovels; D, the plate of iron which serves as a washer above the frame, and through which the teeth pass. E is the key by which the teeth are retained in position; F F, the handles, and G the clevis.

The construction of frame, handles, and other parts, excepting the shanks of the teeth and the arrangement of the shanks in relation to the shovels and fastenings, is of the form in common use. The manner of using the cultivator does not essentially differ from those in use.

The shanks B of the teeth or cultivator-plows are formed with thin sharpened edges, and resemble the ordinary cutter-knife used with a plow for plowing sod-ground, and at the lower ends of these knife-formed shanks there are small shovel-plows, which may be made in any suitable manner to effectually loosen the earth below the surface of the ground. The front sharp edges of these shanks B serve to cut and pull out the weeds and loosen the surface of the ground without throwing it up or forward by the action of the cultivator. Only a small amount of soil is displaced by the sharp front edges of the shanks; but the soil is opened and mellowed by their action. The front edge of the shank B being made sharp and the thickness being only that of the plow-cutter, the soil may be stirred effectually in close proximity to the plants. The lower ends of the shanks being provided with steel shovels or plows, they will loosen up the soil to a greater depth than is effected by the cultivators in use, and at the same time the draft is comparatively light, because the knife-blade shanks B move through the soil without the exertion of much power.

Having fully described my invention, what I claim, and desire to secure by Letters Patent, is—

The combination of the cultivator-teeth, shanks B, shovels C, and frame A, the parts being constructed, arranged, and operating in the manner and for the purpose substantially as described.

JACOB BOWER.

Witnesses:
JAMES TURNER,
SOLOMON BOOKWALTER.